Feb. 11, 1930.    R. B. ROSS, JR., ET AL    1,746,870
DRIVING MECHANISM FOR POWER DRIVEN VEHICLES
Filed July 6, 1929    2 Sheets-Sheet 1
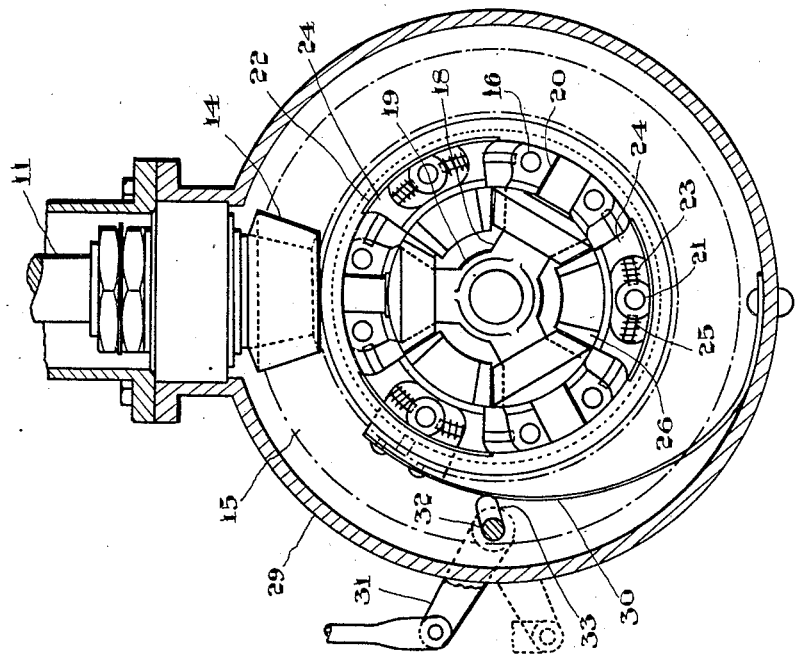
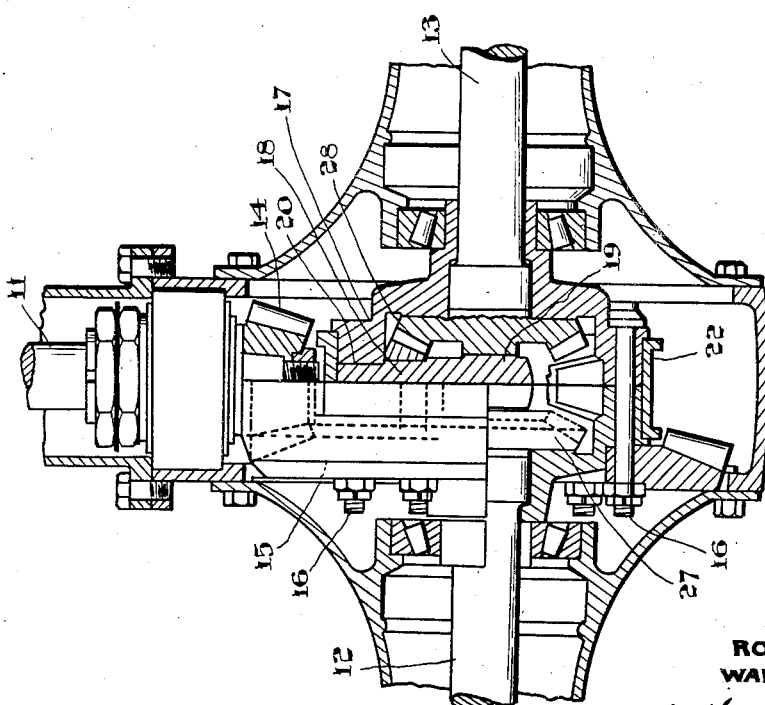
INVENTORS
ROBERT B. ROSS, Jr.
WALTER D. STAVELEY
BY *F. Thurston Haug & Co*
ATTORNEYS

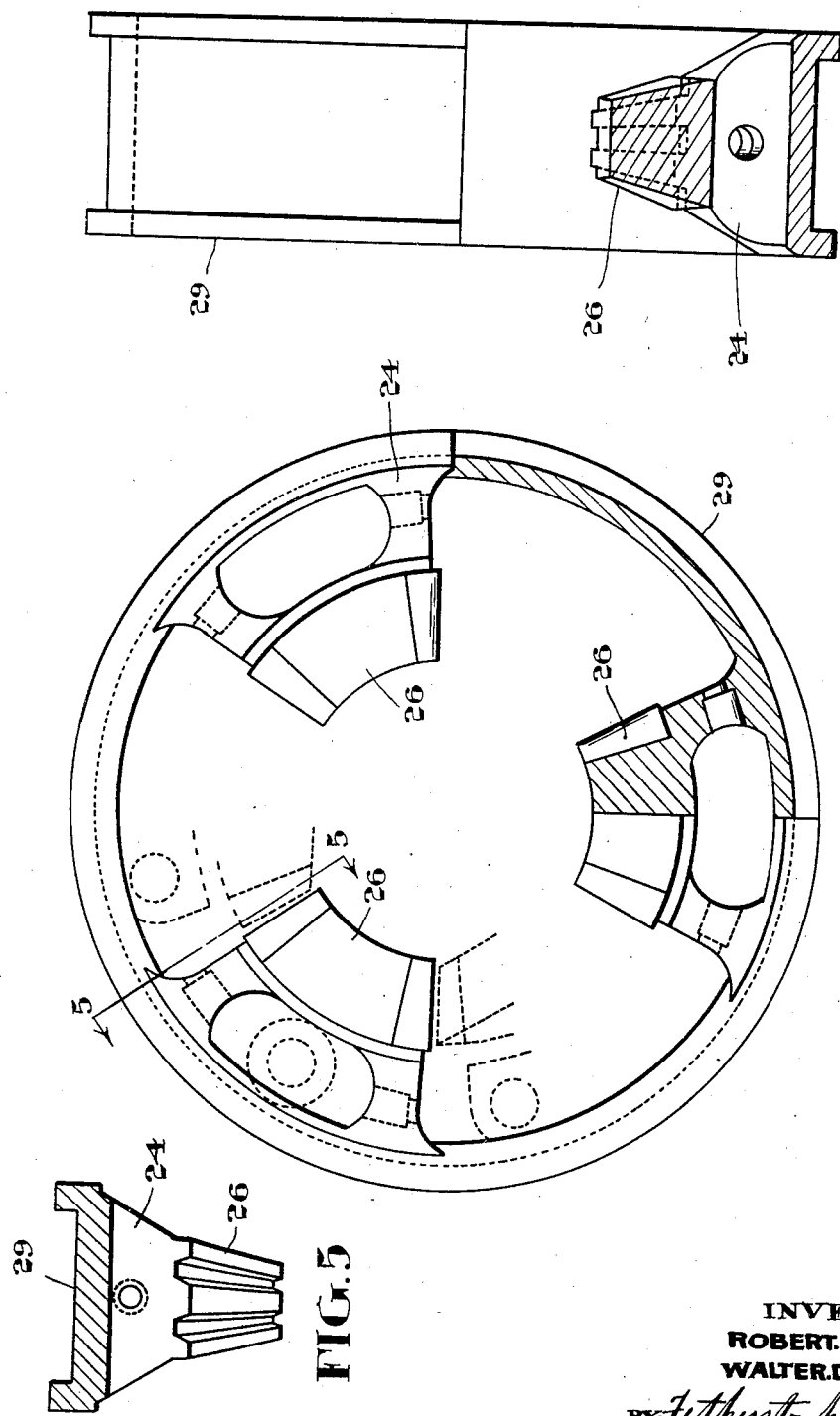

Patented Feb. 11, 1930

1,746,870

UNITED STATES PATENT OFFICE

ROBERT B. ROSS, JR., AND WALTER D. STAVELEY, OF MONTREAL, QUEBEC, CANADA

DRIVING MECHANISM FOR POWER-DRIVEN VEHICLES

Application filed July 6, 1929, Serial No. 376,391, and in Canada June 15, 1929.

This invention relates to new and useful improvements in the driving mechanism for power driven vehicles and the like and particularly to the differential mechanism usually employed for driving the sectional parts of the back axle.

The main object of the invention is to provide a simple and efficient driving mechanism for connecting the axle sections so that they may be driven independently or as a unit.

According to our invention, we provide a differential gear of the usual construction, in which the driving shaft is connected by suitable gearing to a casing within which is rotatably secured bevel toothed pinions adapted to mesh with bevel toothed wheels secured to the adjacent ends of the sections of the driving axle. The bevel toothed pinions are preferably mounted on a spider, which acts as a spacer for the axle ends and also to hold the gearing in place within the casing. The casing is provided with an external groove to receive a friction ring which is provided with arms which extend through the casing and are provided with locking teeth adapted to engage with the teeth of the bevel pinions to prevent their rotation. A friction shoe is provided and this shoe is so mounted that it can be brought into or out of engagement with the friction ring. Means are provided for holding the locking teeth normally out of engagement with the bevel pinions.

In the drawings which illustrate one form of our invention,

Figure 1 is a partial sectional plan view of our improved differential mechanism.

Figure 2 is a partial sectional end view of the mechanism shown in Figure 1.

Figure 3 is a partial sectional end elevation of the friction ring with locking teeth.

Figure 4 is a partial sectional plan view of the ring shown in Figure 3.

Figure 5 is a sectional view taken on the line 5—5 Figure 3.

Referring more particularly to the drawings, 11 designates the driving shaft and 12 and 13 the sections of the back or driving axle. Secured to the main driving shaft is the main bevel toothed pinion 14 which meshes with the bevel teeth of wheel 15 secured by bolts 16 to the differential gear casing 17. This casing is preferably made in sections and the bolts are employed for holding the sections together. The differential pinions are rotatably mounted on the arms 18 of a spider casting 19 placed between the ends of the shafts. The arms are shouldered to position the pinions which are preferably as shown three in number. The arms at their ends fit into complementary grooves 20 formed in the adjacent faces of the casing. Bolts 21 passing through the casing are positioned approximately midway between pinions and in proximity to the internal surface of the casing. A friction ring 22 is rotatably mounted in a peripheral groove in the casing and said ring has spaced arms 24 which normally are positioned equidistant from the central axis of the bolts 21 and on each side thereof. The arms are adapted to slide a predetermined distance in slots not shown. Pins 23 extend between the bolts 21 through the arms 24 and compression springs 25 encircle the said pins and hold the locking teeth 26 between the pinions and clear of same. The locking teeth are formed on projections secured to the arms of the friction ring. The bevel toothed pinions engage with the bevel toothed wheels 27 and 28 secured to the ends of the axles 12 and 13 respectively. It will be readily seen that in normal operation the mechanism operates as an ordinary differential gear, but when the friction ring is held the locking teeth move against the pressure of the springs and engage with the bevel pinions so that the sections are directly coupled and and are driven simultaneously.

In the drawings, we have shown one form of device for frictionally engaging the friction ring. The casing is surrounded by a housing 29 and secured by a flat spring 30 to the internal wall thereof is a friction shoe. Normally, this shoe is out of engagement with the friction ring. A lever 31 is secured to a spindle 32 passing through the casing and secured to said pin is a cam lever 33 which may be quickly brought into or out of contact with the flat spring to bring the friction clutch against the ring or allow the spring to pull the shoe clear of the ring. When the shoe is in frictional contact with the ring, the rotary movement of the ring is retarded and the locking teeth portions move towards the adjacent pinions to lock same to prevent their rotary movement. This locking of the pinions ensures that the driving force is distributed between the axle sections and, therefore, both wheels are turned.

The device is simple in its action and provides a means that will ensure the full power being transmitted to both wheels so that greater traction is obtained for overcoming slip. This arrangement is particularly adaptable for driving out of mud where there is a tendency for one or both of the wheels to slip.

The device is simple in construction and may be fitted to any type of differential to lock the small pinions between the bevel pinions at the ends of the axle sections.

The device provides a means for temporarily connecting the two sections of the rear axle of an automobile or other motor driven vehicle or tractor, having a divided axle, in such a manner that the differential mechanism becomes temporarily inoperative, as a differential, so that both wheels revolve at the same speed regardless of any difference in the tractive resistance offered by the surface on which the rear wheels rest, so that both wheels develop the full possible tractive effort on the surface on which each rests.

In other words, the mechanism provides a means for driving the wheels by means of a differential mechanism or by direct drive, the change being made by the operation of a lever to lock or unlock the small pinions between the bevels at the adjacent ends of the driving axle sections.

Having thus described our invention, what we claim is:

1. In a driving mechanism for power driven vehicles and the like, a driving shaft, a driving axle in section, a casing, a pair of bevel wheels secured to the adjacent ends of the axle and within the casing, a plurality of bevel pinions rotatably mounted within and secured to the casing, each of said bevel pinions being adapted to mesh with the bevel wheels, a friction ring on the outside of the casing and provided with locking teeth, and means operating on the friction ring to hold same to bring the locking teeth into engagement with the pinions.

2. A driving mechanism according to claim 1 in which the friction ring has a plurality of locking teeth located intermediate the bevel pinions and means to normally hold the said teeth clear of the pinions.

3. In a driving mechanism of the differential type comprising a driven casing having spaced inwardly projecting bevel pinions adapted to mesh with bevel wheels secured to a sectional axle, a friction ring rotatably mounted on the casing and having spaced arms projecting therethrough, locking teeth secured to the arms, spring controlled means for holding the locking teeth normally out of engagement with the pinions, and a friction shoe device adapted to be brought into contact with the ring to retard rotation of same to bring the locking teeth into engagement with the pinions.

4. In a driving mechanism of the differential type comprising a driven casing having spaced inwardly projecting rotatably mounted bevel pinions adapted to mesh with bevel wheels secured to the adjacent ends of the sectional parts of an axle, a friction ring rotatably mounted on the casing and having inwardly projecting teeth, means to hold the teeth normally out of engagement with the bevel pinions, a spring controlled shoe adapted to be brought into contact with the ring to retard the rotation of same to bring the locking teeth into engagement with the bevel pinions and means to hold the locking teeth normally out of engagement with the bevel pinions.

5. The combination with a gear drive of the differential type including a driven casing, a pair of axle sections equipped with gear wheels and a plurality of spaced inwardly projecting pinions rotatably carried by said casing and meshing with said gear wheels, of a plurality of pinion locking elements normally centered between said pinions and out of engagement therewith, and means for shifting the locking elements into locking engagement with said pinions to hold the latter against rotation and thereby establish a direct drive between the axle sections.

6. The combination with a gear drive of the differential type including a driven casing, a pair of axle sections equipped with gear wheels and a plurality of spaced inwardly projecting pinions rotatably carried by said casing and meshing with said gear wheels, of a plurality of pinion locking elements positioned in the spaces reserved between said pinions, spring devices normally functioning to hold said elements centered in said spaces and out of engagement with said pinions and means for shifting said elements against the resistance of said spring device and into locking engagement with the pinions, so as to hold the latter against rotation and thereby establish a direct drive between the axle sections.

In witness whereof, we have hereunto set our hands.

ROBERT B. ROSS, JR.
WALTER D. STAVELEY.